Oct. 21, 1952    M. D. BUIVID    2,614,640
ROTOR BLADE SUPPORT

Filed Feb. 1, 1951    2 SHEETS—SHEET 1

INVENTOR
MICHEL D. BUIVID
BY *M. B. Tasker*
ATTORNEY

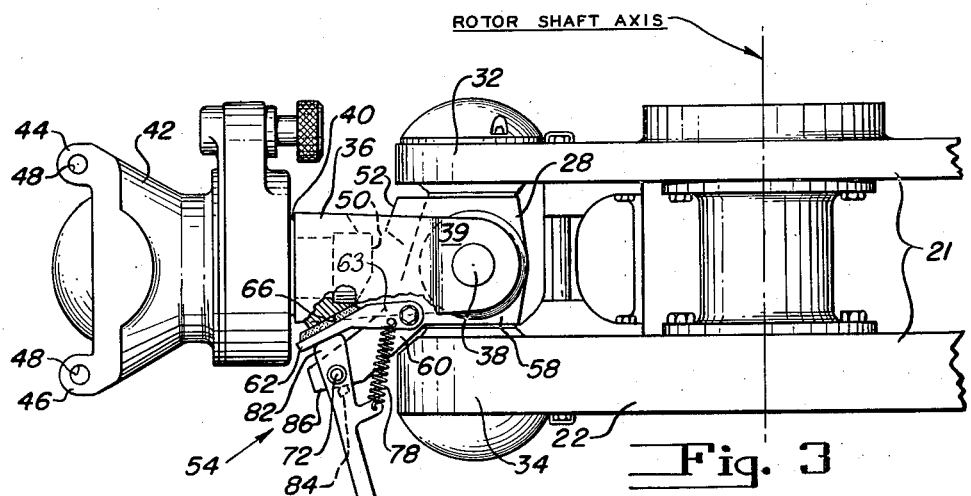
Fig. 3
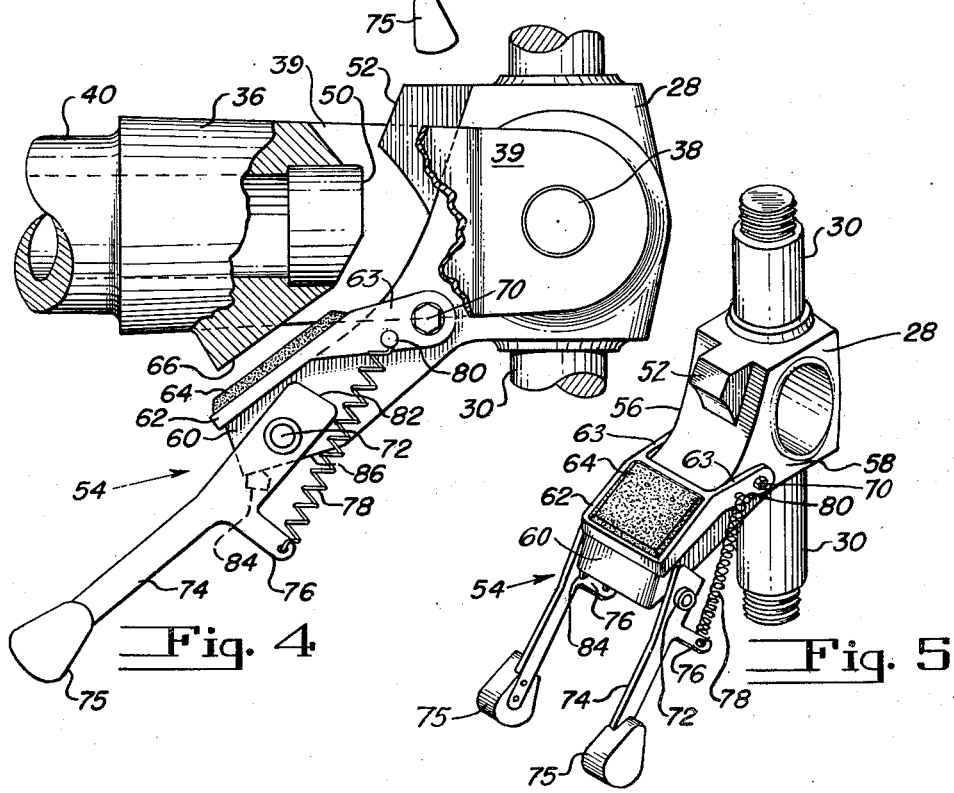
Fig. 4
Fig. 5
INVENTOR
MICHEL D. BUIVID

Patented Oct. 21, 1952

2,614,640

UNITED STATES PATENT OFFICE 2,614,640

ROTOR BLADE SUPPORT

Michel D. Buivid, Milford, Conn., assignor to United Aircraft Corporation, East Hartford, Conn., a corporation of Delaware Application February 1, 1951, Serial No. 208,911

8 Claims. (Cl. 170—160.55)

This invention relates to rotary wing aircraft, for example, helicopters, and particularly to stops for controlling the rotor blades of such aircraft.

An object of this invention is to provide mechanism for limiting the downward movement of the rotor blades of rotary wing aircraft about their flapping hinge, or hinges, when the rotor is stationary or is rotating slowly, but which will permit a greater degree of flapping movement when the blades are rotating at higher speeds.

Another object of the invention is to provide improved automatically operated stops for limiting the downward flapping movement of the blades of such aircraft.

A further object of the invention is to provide improved stops of this type which are responsive to rotor speed.

These and other objects of the invention will be evident from the following specification and claims and from the accompanying drawings which illustrate the invention as applied to a helicopter of the type having each of its rotor blades separately pivoted for flapping movement.

In these drawings:

Fig. 3 is an enlarged detailed view of one of the blade mountings of the rotor hub, with the blade removed, illustrating the position of the stop mechanism when the rotor is stationary or revolving slowly;

Fig. 4 is a further enlarged detailed view showing the stop mechanism of Fig. 3 in the position which it occupies in flight; and Fig. 5 is a perspective view further illustrating the stop mechanism.

Due to their great length, the blades of a helicopter rotor droop downwardly under their own weight when they are not rotating or when they are rotating very slowly. In their drooped position the blade tips must be sufficiently high to permit the rotor to be started without danger of interference of the blade tips with the body of the helicopter. It is common practice to provide some sort of stop to limit the downward movement of the blade root fitting adjacent the rotor hub to provide a safe clearance between the tips of the blades and the fuselage body when the rotor is stationary or upon initial rotation of the rotor.

During certain flight conditions however, the blades may flap through such wide angles about their flapping hinges that they will bump against these stops which subject the blades to severe bending moments. Under such flight conditions the stop mechanism is not necessary since at the higher rotor speed the aerodynamic lift on the blades and the centrifugal force acting spanwise of the blade tends to straighten the blades so that they do not have the droop which is present when the rotor is stationary or rotating at slow speeds.

The improved stop mechanism of this invention acts on the blade roots when the rotor is stationary or is rotating below a predetermined speed to support the drooping blades a safe distance above the helicopter body. However, above a predetermined rotor speed the stop mechanism operates to permit the blade root to assume a lower angular position prior to engaging a limit stop and thus greatly relieves the bending moments to which the blades may be subject in flight.

Figure 1:
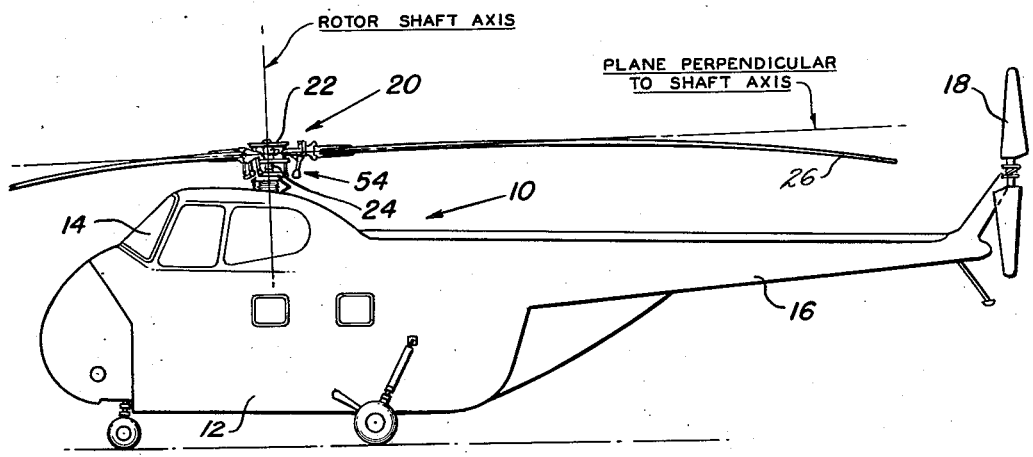
Fig. 1 is a side elevation of a helicopter equipped with the improved blade stops of this invention, the rotor blades being shown in the drooped position which they occupy when at rest.
Figure 2:
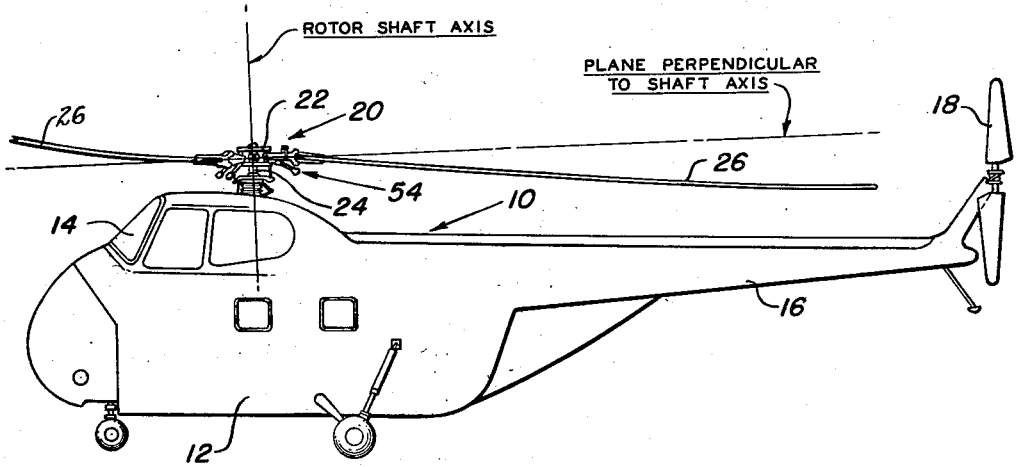
Fig. 2 is a similar view showing one of the many positions which the blades may assume in flight.

Referring to Figs. 1 and 2 of the drawings, the helicopter illustrated comprises a body generally indicated at 10 which includes a center passenger or cargo compartment 12, a pilot compartment 14 and a rearwardly extending cone 16 which supports an anti-torque tail rotor 18. The main rotor generally indicated at 20 includes a hub 22 mounted for rotation by an upstanding drive shaft 24, and a plurality of rotor blades 26 which are pivotally connected to the hub.

Figs. 3 and 4 show the pivotal mounting of a typical rotor blade in the hub 22. Drag link 28, which herein comprises a solid block of material, is mounted between the generally horizontal plates 21 of the hub 22 on a drag hinge 30 which is journalled in upper and lower bearings 32 and 34 in said hub plates. A flapping link 36 is journalled in said drag link 28 on a flapping hinge 38, the flapping link having a yoke-shaped inboard end comprising parallel arms 39 (Fig. 4) which straddle and closely embrace the drag link 28. The outboard end of the flapping link 36 terminates in a stub-shaft 40 on which the blade root fitting 42 is rotatable to effect pitch changes of the blade. It will be understood that the blade carries a pair of lugs similar to the lugs 44 and 46 by which it is secured to the fitting 42 by pins extending through apertures 48 in the complemental lugs, in a well known manner, as shown in Patent No. 2,405,777, issued August 13, 1948, to Michel D. Buivid.

The pivotal movement of the flapping link 36 about its hinge 38 is limited in its upward swinging movement by the engagement of the plug 50 at the base of the yoke of link 36 with an abutment 52 formed as an integral boss of required size on the drag link 28. The downward swinging movement of the flapping link is controlled by the stop mechanism comprising this invention and which is generally indicated at 54.

The drag link 28, as previously stated, comprises a solid block of material and this block is formed with parallel side faces 56 and 58. The link 28 in addition to carrying the projecting abutment 52 also forms the stop supporting member for the droop stop mechanism. To this end it has a downwardly directed toe 60 which together with mechanism to be described forms the stop mechanism for limiting the downward flapping of the blade.

The stop mechanism comprises a pivoted flap member 62 which may be termed the relatively stationary stop and cooperates with the flapping link 36 to limit the downward swinging movement of the latter. Member 62 comprises in effect a plate carrying on its upper face a resilient shock pad 64 which is engageable by a solid abutment 66 on the under side of the yoke of flapping link 36. Member 62 is mounted for pivotal movement on link 28 by a pair of arms 68 which form a yoke straddling the parallel sides 56 and 58 of the drag link, a bolt 70 which extends through said arms and through said drag link forming the pivotal support.

The flap member 62 in its lowermost position (Fig. 4) rests upon the top surface of the toe 60 of the drag link 28 which forms a rigid support for the flap member. In this position the abutment 66 on flapping link 36 may engage the pad 64 mounted on member 62 with the latter forming a somewhat resilient abutment to stop the downward flapping movement of the blade supported by the flapping link. During flight, in the embodiment shown, the flapping link 36 is therefore permitted a downward movement through an angle, for example, of 5° from the horizontal before engagement of the abutment 66 and the pad 64 occurs.

Means are provided, however, to hold the flap member 62 in the elevated position thereof shown in Fig. 3 when it is desired to prevent the flapping link from moving below the horizontal position of the blade illustrated. To this end a shaft 72 is journalled in the extremity of the toe portion 60 of the drag link to the opposite ends of which are secured depending pendulum arms 74 each carrying at its lower extremity a weight 75. The arms 74 are further provided with inwardly directed projections 76. Tension springs 78 are secured at their lower ends to the extremities of projections 76 and at their upper ends to pins 80 on the arms 68 of member 62. These springs constantly bias the flap member downwardly while at the same time biasing the pendulum arms 74 inwardly at their lower ends into the position shown in Fig. 3. The arms 74 are provided with cam-shaped abutments 82 at their upper ends which in normal flight when arms 74 are swung out occupy the position shown in Fig. 4 in which they are out of contact with the flap member 62. As the rotor is slowed down, however, to the predetermined R. P. M. at which the springs 78 overcome the centrifugal force of weighted arms 74 and swing the latter counterclockwise, the abutments 82 cam the flap member 62 into the raised position thereof shown in Fig. 3. In this position of the stop mechanism the abutment 66 of the flapping link 36 engages the shock pad 64 and prevents the blade from moving below the generally horizontal position shown in Fig. 3.

The confronting inner faces of arms 74 carry stops 84 which engage a flat portion 86 on the toe 60 in the extreme positions of these arms under the action of springs 78 in one direction and centrifugal force in the opposite direction. Thus in Fig. 3 the stop 84 on one arm is shown engaging the portion 86 to limit the counterclockwise movement of the arms 74 while in Fig. 4 the stop is shown in position to limit the clockwise movement of the arms under the action of centrifugal force.

When the helicopter is on the ground and the rotor is stationary or is rotating slowly (below the predetermined R. P. M.) the blade and the droop stop mechanism are in the position shown in Figs. 1 and 3 in which the hinged flap 62 is held in the raised position by the abutments 82. As long as the parts remain in this position the rotor blade is prevented from moving below the generally horizontal position shown in Fig. 3 or slightly below this position as may be required by a given installation.

As the rotor speed increases to the predetermined R. P. M. at which centrifugal force acting on the pendulum weights 75 is sufficient to overcome the springs 78, the parts move into the position shown in Fig. 4 in which the abutments 82 are moved from beneath the flap member 62 and the latter, under the action of gravity and the springs 78, drops into engagement with the toe portion 60. It will be noted that in this position of the parts, while the blade is shown in the horizontal position, it is free to flap about the flapping hinge 38 until the abutment surface 66 engages the shock pad 64.

It will thus be evident that as a result of this construction a rotor has been provided in which the blades are free to flap through a greater angle in flight when the lift on the blade and the centrifugal force acting thereon holds the blades in a straightened position, while limiting the downward flapping of the blades beyond their horizontal position when the blades are stationary or are rotating so slowly that the blade tips droop.

It will also be evident that by the improved stop mechanism provided, the action of this mechanism is sufficiently positive to avoid failure in use. It will also be noted that a speed responsive droop stop mechanism has been provided while retaining the advantages of a shock absorbing pad for limiting the downward flapping movement of the blade. The improved stop mechanism has the further advantage that in flight, when the greatest forces are exerted, the speed responsive elements of the mechanism are never engaged by the blades.

While a single embodiment has been shown and described herein, it will be evident that various changes in the construction and arrangement of the parts may be made without departing from the scope of the invention.

I claim:

1. Droop stop mechanism for rotary wing aircraft of the type having a rotor drive shaft, a hub rotatable by said shaft, and a blade pivoted in said hub for flapping movement, said mechanism including a supporting member rotatable with said shaft and having an abutment beneath said blade, a flap hinged on said supporting member and carrying a shock pad located between said blade and said abutment, said flap having its hinge so located that said flap can rest upon said abutment, and a pendulum member also hinged intermediate its ends on said supporting member in position to be acted upon by centrifugal force, said pendulum member having a flyweight on its lower end and cam means on its upper end in position to engage and raise said flap and support the latter off said abutment whenever said blade is rotating below a predetermined speed.

2. Droop stop mechanism for rotary wing aircraft of the type having a rotor drive shaft, a hub rotatable by said shaft, and a blade having its root portion pivoted for flapping movement on said hub, said mechanism including a supporting member rotatable with said hub having an upwardly facing abutment, a flap pivoted on said member between said abutment and said blade root portion, said flap having a shock pad in position to engage the root portion of said blade and adapted during rotation of said rotor above a predetermined speed to be supported on said abutment, thus permitting the blade to flap downwardly through a maximum angle, a pendulum member pivotally mounted on said supporting member for outward movement about an axis transverse to said drive shaft in response to centrifugal force, means for constantly biasing said pendulum member inward against centrifugal force, and cam means operated by said pendulum member and engageable with said flap when the speed of said blade falls below said predetermined R. P. M. for raising said flap and supporting the latter above said abutment.

3. Droop stop mechanism for rotary wing aircraft of the type having an upstanding rotor drive shaft, a rotor hub mounted on said shaft for rotation about the axis of said shaft, and a rotor blade having its root portion pivotally mounted in said hub for flapping movement about an axis transverse to said shaft axis, said mechanism including a stop supporting member mounted in said hub and rotatable with said blade, said member having a portion projecting beneath said blade root portion and forming an abutment, a flap also pivoted on said supporting member and carrying a shock pad, the pivot for said flap being so located as to position said pad between said abutment and said blade root portion, and a pendulum member pivoted on said support having an abutment engageable with said flap, said pendulum member adapted to swing under the influence of centrifugal force due to rotation of said blade between an inboard position in which its abutment engages and raises said flap and an outboard position in which said flap occupies a lower position against said abutment.

4. Droop stop mechanism for rotary wing aircraft of the type having an upstanding rotor drive shaft, a rotor hub mounted on said shaft for rotation about the axis of said shaft, and a rotor blade having its root portion pivotally mounted in said hub for flapping movement about an axis transverse to said shaft axis, said mechanism including a stop supporting member mounted in said hub and rotatable with said blade, said member having a portion projecting beneath said blade root portion and provided with an abutment, a flap also pivoted on said supporting member and carrying a shock pad, the pivot for said flap being so located as to position said pad between said abutment and said blade root portion, a pendulum member pivoted on said support having an abutment engageable with said flap, said pendulum member adapted to swing under the influence of centrifugal force due to rotation of said shaft between an inboard position in which its abutment engages and raises said flap and an outboard position in which said flap occupies a lower position against said abutment, and a tension spring connected at one of its ends to said flap and at the other of its ends to said pendulum member for constantly biasing said flap down against said abutment and for constantly biasing said pendulum member against the action of centrifugal force.

5. Droop stop mechanism for rotary wing aircraft of the type having an upstanding rotor drive shaft, a rotor hub mounted on said shaft for rotation about the axis of said shaft, and a rotor blade having its root portion pivotally mounted in said hub for flapping movement about an axis transverse to said shaft axis, said mechanism including a stop supporting member mounted in said hub and rotatable with said blade, said member having a portion projecting beneath said blade root portion and provided with an abutment, a pendulum member pivoted on said supporting member having an abutment, the pivot for said pendulum member being transverse to said drive shaft axis whereby said pendulum member is swung outwardly under the action of centrifugal force upon rotation of said shaft, spring means for biasing said pendulum member against centrifugal force, a flap also pivoted on said supporting member carrying a shock pad, the pivot for said flap being so located as to position said pad between said abutment and said blade root portion, and cooperating stop means on said pendulum member and said supporting member for limiting the swinging movement of the former under the action of both centrifugal force and the action of said spring means.

6. Droop stop mechanism for rotary wing aircraft of the type having an upstanding rotor drive shaft, a rotor hub mounted on said shaft for rotation about the axis of said shaft and a rotor blade having its root portion pivotally mounted in said hub for flapping movement about an axis transverse to said shaft axis, said mechanism including a stop supporting member mounted in said hub and rotatable with said blade, said member having a portion projecting beneath said blade root portion and provided with an abutment, a pendulum member pivoted on said supporting member having its pivot located transverse to the axis of said drive shaft, whereby said pendulum member is swung outwardly by centrifugal force when said shaft is rotating, a flap also pivoted on said supporting member carrying a shock pad, the pivot for said flap being so located as to position said pad between said abutment and said blade root portion, and means for biasing said flap downwardly onto said abutment surface and said pendulum member inwardly comprising a tension spring connected at one end to said flap and at its other end to said pendulum member at points spaced from the pivots for said flap and member.

7. Droop stop mechanism for rotary wing aircraft of the type having a rotor drive shaft, a hub rotatable by said shaft, and a blade having a root portion pivoted in said hub for flapping movement, said mechanism including a supporting member mounted in said hub for rotation therewith having an upper abutment face, a flap carrying a shock pad located between said face and said root portion of said blade, said flap including a pair of arms having pivotal connections at opposite sides of said supporting member, means responsive to centrifugal force including a pendulum arm pivoted intermediate its ends on said member for movement about an axis transverse to said drive shaft, said arm having a weight at its lower end and having a cam at its upper end engageable with said flap to raise the latter whenever said arm is swung inwardly about its pivot, and means for constantly biasing said arm inwardly against centrifugal force.

8. Droop stop mechanism for rotary wing aircraft of the type having a rotor drive shaft, a hub rotatable by said shaft, and a blade having its root portion pivoted in said hub for flapping movement, said mechanism including a bracket member rotatable with said shaft and having an abutment extending beneath the pivoted end of said blade, upper and lower abutments on said bracket member engageable with the root portion of said blade for limiting the flapping movements of the latter, a flap pivoted on said bracket member having a shock pad located between the lower abutment on said member and said blade root, a pendulum arm pivoted intermediate its ends on said member for movement about an axis transverse to said rotor drive shaft, said arm having a weight on its lower end and a cam on its upper end engageable with said flap to raise the latter whenever said arm is swung inwardly toward said drive shaft, said pivotal support for said flap being located on said bracket in position to support said flap on said lower abutment on said bracket member when said arm is swung outward by centrifugal force in which position said blade lies below the horizontal whenever it engages said shock pad, and means for constantly biasing said arm to swing inwardly to cause said cam to raise said flap off said bracket member into a position in which a blade resting thereon is substantially horizontal.

MICHEL D. BUIVID.

REFERENCES CITED

The following references are of record in the file of this patent:

UNITED STATES PATENTS

| Number | Name | Date |
|---|---|---|
| 1,960,359 | Vincent | May 29, 1934 |
| 1,980,169 | Cierva | Nov. 13, 1934 |
| 2,151,215 | Larsen | Mar. 21, 1939 |
| 2,396,038 | Bossi | Mar. 5, 1946 |
| 2,465,674 | Crowell | Mar. 29, 1949 |
| 2,481,747 | Hiller | Sept. 13, 1949 |